US012228996B2

United States Patent
Luthra et al.

(10) Patent No.: US 12,228,996 B2
(45) Date of Patent: Feb. 18, 2025

(54) APPARATUS AND METHOD FOR IMPLEMENTING O-CLOUD NODE P-STATE CHANGE

(71) Applicant: RAKUTEN MOBILE, INC., Tokyo (JP)

(72) Inventors: Mohit Luthra, Singapore (SG); Awn Muhammad, Tokyo (JP); Pankaj Shete, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 0 days.

(21) Appl. No.: 18/002,971

(22) PCT Filed: Nov. 14, 2022

(86) PCT No.: PCT/US2022/049761
§ 371 (c)(1),
(2) Date: Dec. 22, 2022

(87) PCT Pub. No.: WO2024/035418
PCT Pub. Date: Feb. 15, 2024

(65) Prior Publication Data
US 2024/0231472 A1    Jul. 11, 2024

(30) Foreign Application Priority Data
Aug. 12, 2022   (SG) .......................... 10202250732B

(51) Int. Cl.
*G06F 1/3296* (2019.01)
*H04L 41/0833* (2022.01)
(Continued)

(52) U.S. Cl.
CPC ........ *G06F 1/3296* (2013.01); *H04L 41/0833* (2013.01); *H04W 24/08* (2013.01); *H04W 52/0206* (2013.01)

(58) Field of Classification Search
CPC .. G06F 1/3296; H04L 41/0833; H04W 24/08; H04W 52/0206; H04W 52/0216
See application file for complete search history.

(56) References Cited

U.S. PATENT DOCUMENTS

2021/0096896 A1* 4/2021 Das ......................... G06F 1/324
2021/0258866 A1* 8/2021 Chou ..................... H04W 48/16
(Continued)

FOREIGN PATENT DOCUMENTS

CN       117956435 A   *  4/2024
WO    WO-2024179716 A1  *  9/2024  ........... G06F 1/3234

OTHER PUBLICATIONS

Written Opinion (PCT/ISA/237) dated Mar. 8, 2023 issued by the International Searching Authority in International Application No. PCT/US2022/049761.
(Continued)

*Primary Examiner* — Hyun Soo Kim
(74) *Attorney, Agent, or Firm* — Sughrue Mion, PLLC

(57) ABSTRACT

A system and method are provided for modifying P-state of processors in nodes within an O-Cloud infrastructure of a telecommunications network. The method includes: obtaining, by a federated O-Cloud orchestration and management module (FOCOM) within a service management orchestration (SMO) framework, a request to modify a P-state of a processor of an O-Cloud node; sending, by the FOCOM, a request to modify the P-state of the processor of the O-Cloud node via an O2 interface to an infrastructure management service module (IMS); receiving, by the IMS via the O2 interface, the request to modify the P-state of the processor of the O-Cloud node; controlling, by the IMS, implementation of the request to modify the P-state of the processor of the O-Cloud node; and sending, by the IMS to the
(Continued)

FOCOM via the O2 interface, a confirmation of the P-state modification of the processor of the O-Cloud node.

19 Claims, 8 Drawing Sheets

(51) Int. Cl.
  *H04W 24/08* (2009.01)
  *H04W 52/02* (2009.01)

(56) References Cited

U.S. PATENT DOCUMENTS

2022/0326757 A1\* 10/2022 Sydir ................ H04W 52/0216
2023/0014932 A1\*  1/2023 Huang ................. H04B 7/0413
2023/0385042 A1\* 11/2023 Obando Chacon ....... G06F 8/40
2024/0007946 A1\*  1/2024 Ram ..................... H04L 41/344

OTHER PUBLICATIONS

International Search Report (PCT/ISA/210) dated Mar. 8, 2023 issued by the International Searching Authority in International Application No. PCT/US2022/049761.

\* cited by examiner

APPARATUS AND METHOD FOR IMPLEMENTING O-CLOUD NODE P-STATE CHANGE

CROSS-REFERENCE TO RELATED APPLICATION(S)

This application is a National Stage of International Application No. PCT/US2022/049761 filed Nov. 14, 2022, claiming priority based on Singapore Provisional Patent application Ser. No. 10202250732B, filed at the Singaporean Patent Office on Aug. 12, 2022, the disclosure of which is incorporated by reference herein in its entirety.

FIELD

Apparatuses and methods consistent with example embodiments of the present disclosure relate to methods of optimizing process power consumption in distributed network devices.

BACKGROUND

In the related art, a radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

FIG. 1 is a diagram of a related art O-RAN architecture, FIG. 2 is a diagram of a related art Service Management and Orchestration (SMO) framework with a non-real-time (NRT) RAN Intelligent Controller (RIC) architecture in a functional view, and FIG. 3 is a diagram of a related art SMO framework with an NRT RIC in a services view. Referring to FIGS. 1 through 3, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: an NRT RIC and a near-real-time RIC (nRT RIC).

The NRT RIC is the control point of a non-real-time control loop and operates on a timescale greater than 1 second within the SMO framework. Its functionalities are implemented through modular applications called rApps (rApp 1, . . . , rApp N in FIGS. 1-3), and include: providing policy based guidance and enrichment across the A1 interface, which is the interface that enables communication between the NRT RIC and the nRT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., nRT RIC, O-RAN Centralized Unit (O-CU), O-RAN Distributed Unit (O-DU), etc.).

The nRT RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The nRT RIC uses the E2 interface to control the underlying RAN elements (E2 nodes/network functions (NFs)) over a near-real-time control loop. The nRT RIC monitors, suspends/stops, overrides, and controls the E2 nodes (O-CU, O-DU, and O-eNB) via policies. For example, the nRT sets policy parameters on activated functions of the E2 nodes. Further, the nRT RIC hosts xApps to implement functions such as quality of service (QOS) optimization, mobility optimization, slicing optimization, interference mitigation, load balancing, security, etc. The two types of RICs work together to optimize the O-RAN. For example, the NRT RIC provides, over the A1 interface, the policies, data, and artificial intelligence (AI)/machine learning (ML) models enforced and used by the nRT RIC for RAN optimization, and the nRT returns policy feedback (i.e., how the policy set by the NRT RIC works).

The SMO framework, within which the NRT RIC is located, manages and orchestrates RAN elements. Specifically, the SMO manages and orchestrates what is referred to as the O-RAN Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides infrastructure management services (IMS) and deployment management services (DMS).

Each O-Cloud node generally includes one or more processors or CPUs, and each such processor consumes a given amount of power. One known method of CPU power management is the modification of the C-states and P-states of the processor. More specifically, there are generally two ways to manage the power consumed by a CPU: (1) eliminate power consumed by certain subsystems of the CPU (such as one or more cores or specific caches of memory) by completely powering down said subsystems (i.e., certain functions are reduced or turned off by eliminating the voltage supply to the associated subsystems of the CPU); or, (2) decrease power consumption by decreasing the voltage and/or frequency of the CPU (or one or more of its subsystems). Of these two options, the former is accomplished by modifying the "C-state" (also known as the "idle state" or "idle power saving state") of the processor, and the latter is accomplished by modifying the "P-state" (also known as the "execution power saving state").

Generally, the C-states and P-states are numbered starting from zero (e.g., C0, C1 . . . and P0, P1 . . . ). The general convention is that, the higher the number is, the more power is saved. C0 means no power saving, as everything is powered on. Likewise, P0 means maximum performance, thus maximum frequency, voltage and power used. Different CPUs have different C-states and P-states.

P-states are only relevant where the CPU core is in C0 state because the CPU must be powered to execute a code. P-states allow changes in the voltage and frequency (i.e., operating point) of the CPU core to decrease power consumption by the CPU. There are a set of P-states which correspond to different operating points (voltage-frequency pairs), and a given P-state refers to one such operating point. The highest (frequency and voltage) operating point is generally the maximum performance state, which is P0. Generally, modifications of P-state are accomplished by selecting a desired CPU operating frequency (and voltage is modified accordingly). Just as with C-states, different CPUs have different available P-states. Additionally, most modern CPUs have multiple cores in a single package, and the P-state of a CPU may be modified at the CPU package level or at the individual core level.

Example embodiments of the present disclosure provide a method and system in which the power consumption of an O-Cloud node is managed by adjusting the P-state (i.e., CPU operating frequency) of one or more processors incorporated into said node.

In the related art, CPUs included in O-Cloud nodes may operate at full capacity, and thus at full power, even though the amount of traffic occurring on the node does not warrant such operational capacity nor the associated power consumption, resulting in unnecessary and inefficient power consumption.

SUMMARY

According to embodiments, systems and methods are provided for modifying the P-state of processors in open cloud (O-Cloud) nodes within an O-Cloud infrastructure of a telecommunications network in order to reduce power consumption associated with processors within the O-Cloud infrastructure.

According to an embodiment, a method of managing power consumption of one or more open cloud (O-Cloud) nodes within an O-Cloud infrastructure of a telecommunications network, the method performed by at least one processor and including: obtaining, by a federated O-Cloud orchestration and management module (FOCOM) within a service management orchestration (SMO) framework, a request to modify a P-state of a processor of an O-Cloud node within the O-Cloud infrastructure of the telecommunications network; sending, by the FOCOM, a request to modify the P-state of the processor of the O-Cloud node via an O2 interface to an infrastructure management service module (IMS); receiving, by the IMS via the O2 interface, the request to modify the P-state of the processor of the O-Cloud node; controlling, by the IMS, implementation of the request to modify the P-state of the processor of the O-Cloud node; and sending, by the IMS to the FOCOM via the O2 interface, a confirmation of the P-state modification of the processor of the O-Cloud node.

The method performed by at least one processor may further include: monitoring, by a non-real-time radio intelligent controller (NRT RIC), an O-Cloud data received over the O2 interface; analyzing the O-Cloud data and, based on the analysis, identifying the O-Cloud node to be modified within the O-Cloud infrastructure; and sending the O-Cloud node P-state modification request to the FOCOM.

The method performed by at least one processor may further include: monitoring, by a user, an O-Cloud data received over the O2 interface; analyzing the O-Cloud data and, based on the analysis, identifying the O-Cloud node to be change within the O-Cloud infrastructure; and sending the O-Cloud node P-state modification request to the FOCOM.

The method performed by at least one processor may further include: sending, by the FOCOM to at least one of a user and a non-real-time radio intelligent controller (NRT RIC), a confirmation of the P-state modification of the process of the O-Cloud node.

The O-Cloud data received over the O2 interface may include at least one of a processor utilization and a memory utilization.

According to an embodiment, a system for managing power consumption of one or more open cloud (O-Cloud) nodes within an O-Cloud infrastructure of a telecommunications network is provided, the system including: at least one memory configured to store computer program code; and at least one processor configured to access said at least one memory and operate as instructed by said computer program code, said computer program code including: O-Cloud infrastructure implementation code configured to cause the at least one processor to implement: (i) a federated O-Cloud orchestration and management module (FOCOM) within a service management orchestration (SMO) framework, (ii) an infrastructure management service module (IMS), and (iii) an O2 interface between the SMO and the IMS; obtaining code configured to cause the at least one processor to obtain, by the FOCOM, a request to modify a P-state of a processor of an O-Cloud node within the O-Cloud infrastructure of the telecommunications network; sending code configured to cause the at least one processor to send a request, from the FOCOM to the IMS via the O2 interface, to modify the P-state of the processor of the O-Cloud node; controlling code configured to cause the at least one processor to implement, by the IMS, the request to modify the P-state of the processor of the O-Cloud node; and sending code configured to cause the at least one processor to send, from the IMS to the FOCOM via the O2 interface, a confirmation of the P-state modification of the processor of the O-Cloud node.

The O-Cloud infrastructure implementation code may further include code configured to cause the at least one processor to implement a non-real-time radio intelligent controller (NRT RIC), and wherein the computer program code may further include: monitoring code configured to cause the at least one processor to receive, by the NRT RIC via the O2 interface, an O-Cloud data; analyzing code configured to cause the at least one processor to analyze, by the NRT RIC, the O-Cloud data and, based on the analysis, identify the O-Cloud node to be modified within the O-Cloud infrastructure; and sending code configured to cause the at least one processor to send, by the NRT RIC to the FOCOM, the O-Cloud node P-state modification request.

The system may further include a human-machine interface configured to allow a user to receive and analyze an O-Cloud data via the O2 interface and to further allow the user to send the O-Cloud node P-state modification request to the FOCOM.

According to an embodiment, a non-transitory computer readable medium having instructions stored therein is provided, which when executed by a processor cause the processor to execute method of managing power consumption of one or more open cloud (O-Cloud) nodes within an O-Cloud infrastructure of a telecommunications network, the method including: obtaining, by a federated O-Cloud orchestration and management module (FOCOM) within a service management orchestration (SMO) framework, a request to modify a P-state of a processor of an O-Cloud node within the O-Cloud infrastructure of the telecommunications network; sending, by the FOCOM, a request to modify the P-state of the processor of the O-Cloud node via an O2 interface to an infrastructure management service module (IMS); receiving, by the IMS via the O2 interface, the request to modify the P-state of the processor of the O-Cloud node; controlling, by the IMS, implementation of the request to modify the P-state of the processor of the O-Cloud node; and sending, by the IMS to the FOCOM via the O2 interface, a confirmation of the P-state modification of the processor of the O-Cloud node.

The non-transitory computer readable medium having instructions stored therein, which when executed by a processor may cause the processor to execute the following additional operations: monitoring, by a non-real-time radio intelligent controller (NRT RIC), an O-Cloud data received over the O2 interface; analyzing the O-Cloud data and, based on the analysis, identifying the O-Cloud node to be modified within the O-Cloud infrastructure; and sending the O-Cloud node P-state modification request to the FOCOM.

The non-transitory computer readable medium having instructions stored therein, which when executed by a processor may cause the processor to execute the following additional operations: monitoring, by a user, an O-Cloud data received over the O2 interface; analyzing the O-Cloud data and, based on the analysis, identifying the O-Cloud node to be change within the O-Cloud infrastructure; and sending the O-Cloud node P-state modification request to the FOCOM.

The non-transitory computer readable medium having instructions stored therein, which when executed by a processor may cause the processor to execute the following additional operations: sending, by the FOCOM to at least one of a user and a non-real-time radio intelligent controller (NRT RIC), a confirmation of the P-state modification of the process of the O-Cloud node.

The O-Cloud data received over the O2 interface comprises at least one of a processor utilization and a memory utilization.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
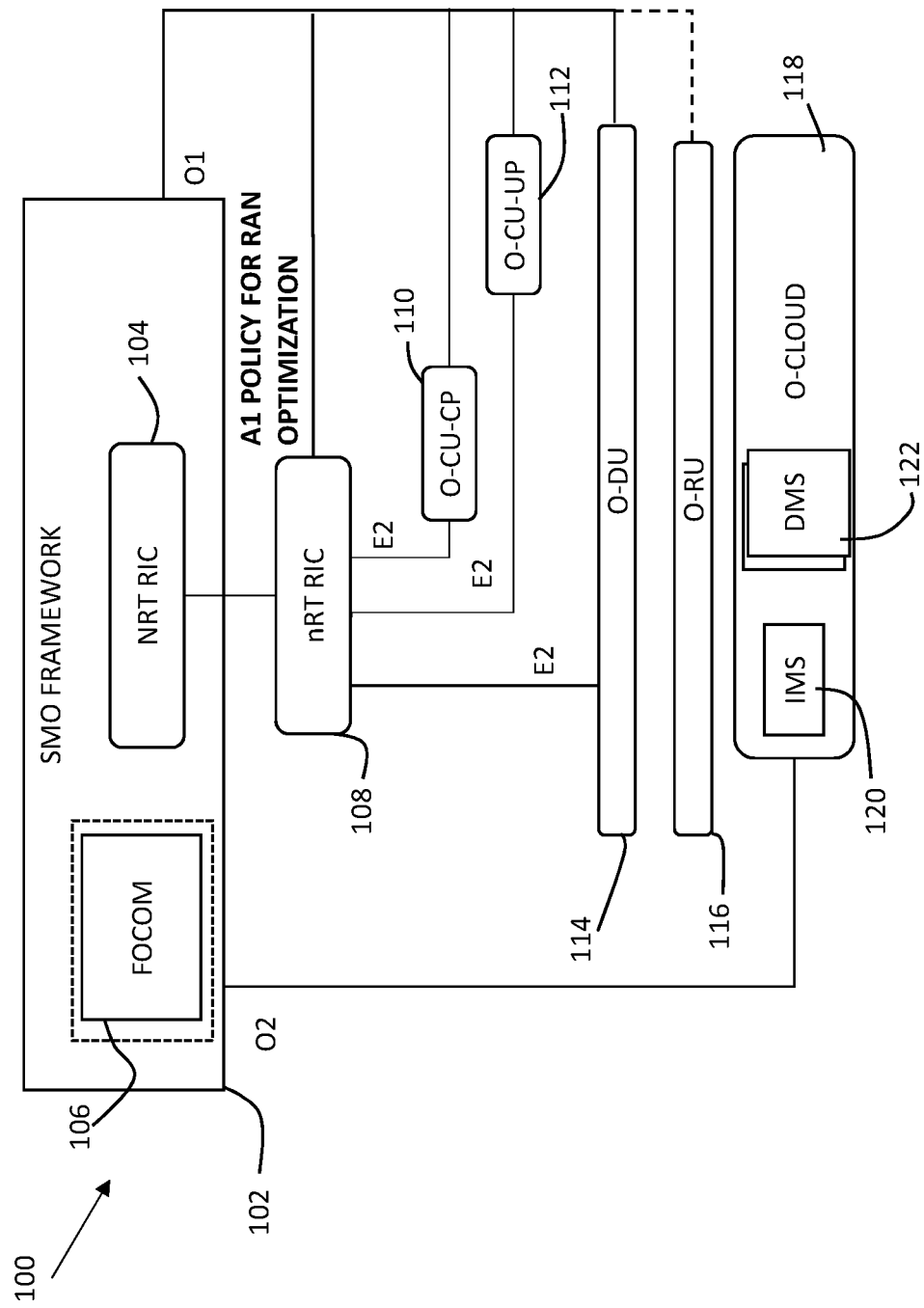
FIG. 1 is a diagram of an O-RAN architecture according to an embodiment.
Figure 2:
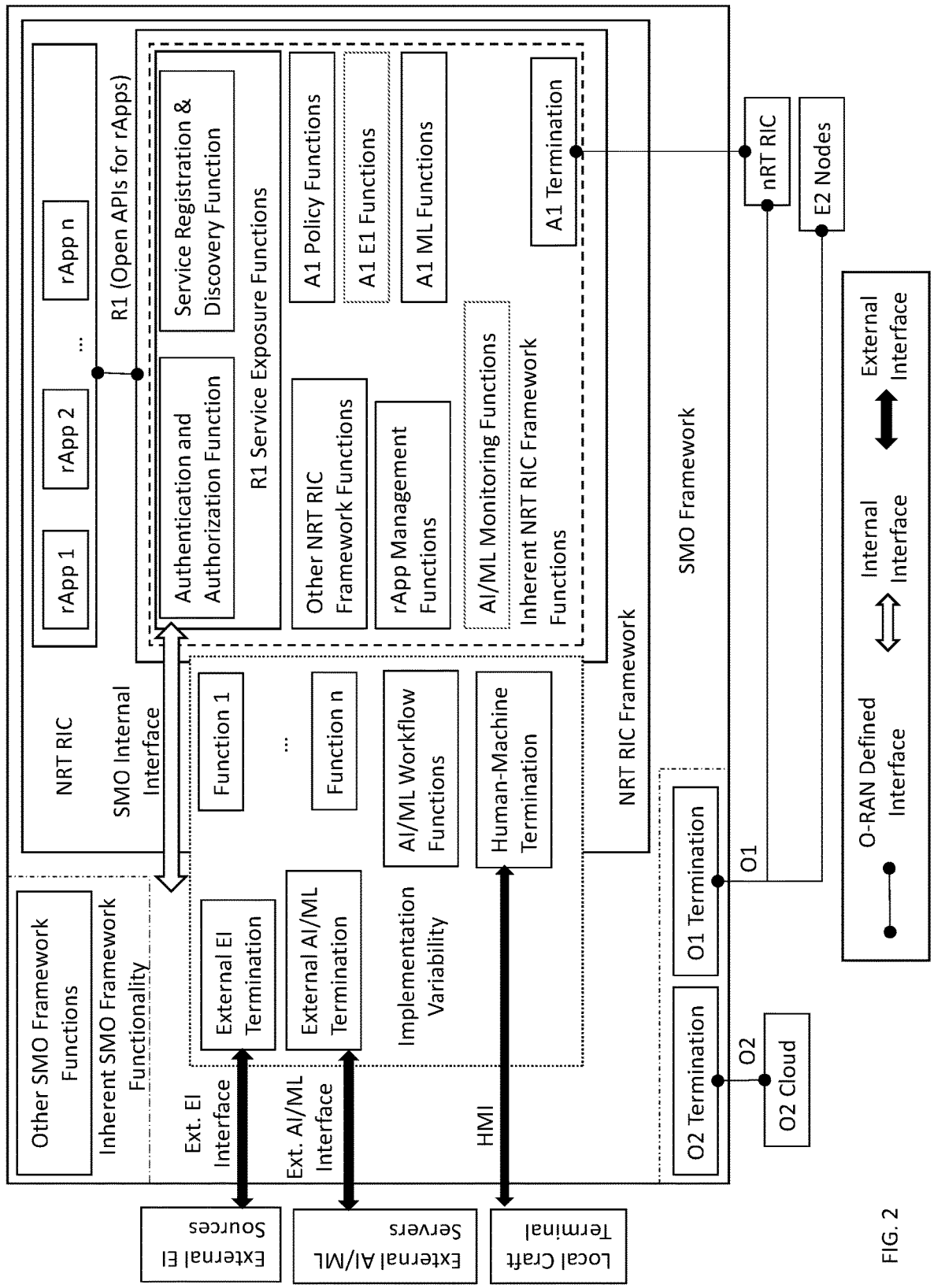
FIG. 2 is a diagram of a related art Service Management and Orchestration (SMO) framework with a non-real-time (NRT) RAN Intelligent Controller (RIC) architecture in a functional view.
Figure 3:
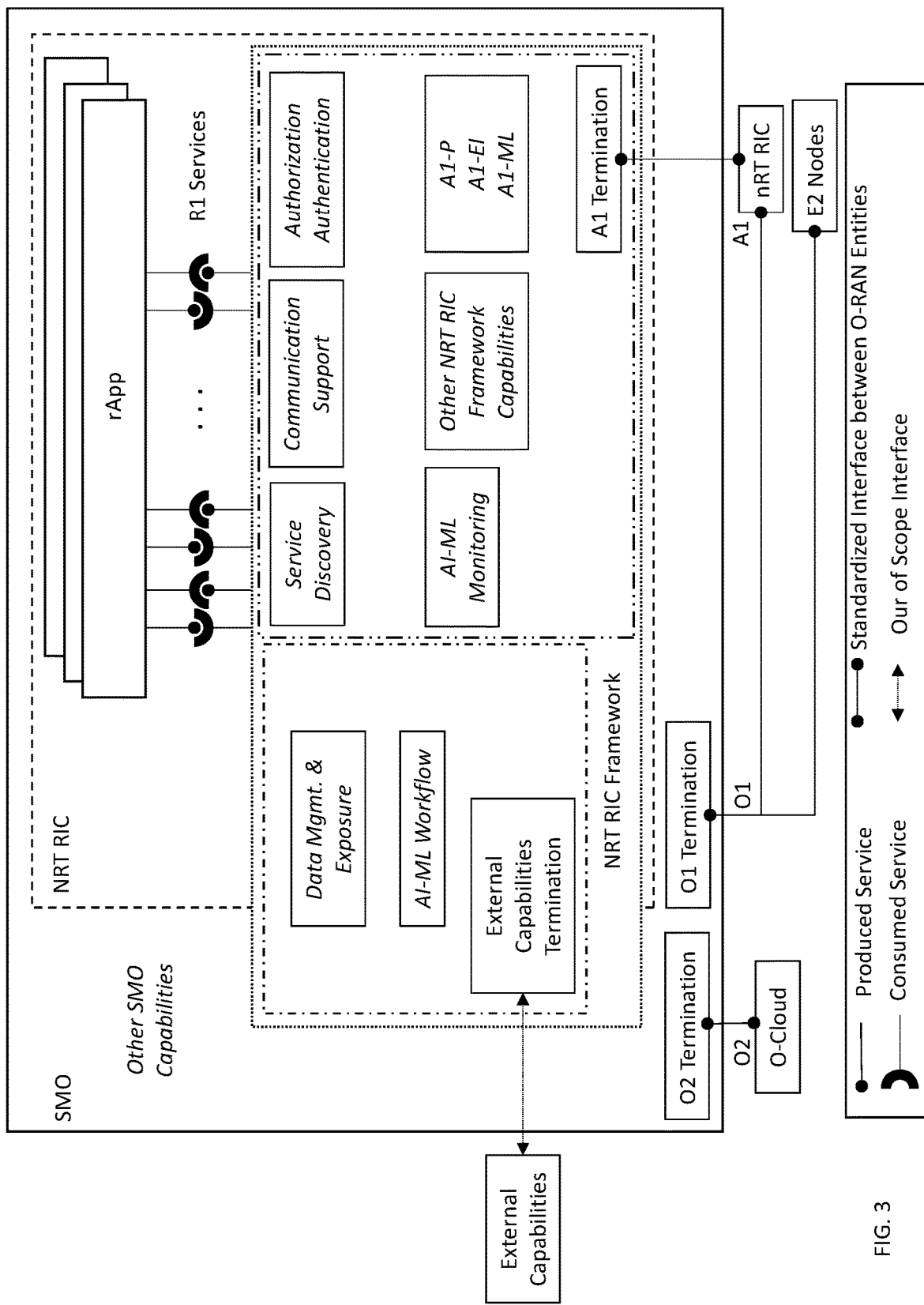
FIG. 3 is a diagram of a related art SMO framework with an NRT RIC in a services view.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments provide a system (as well as methods, devices, networks, etc.) for power management in an open radio access network (O-RAN). In particular, the system may monitor the O-RAN by obtaining parameters indicating traffic levels of O-RAN Cloud (O-Cloud) nodes. The parameters indicating traffic levels may include a central processing unit (CPU) usage of an O-Cloud node, a current CPU operating frequency of an O-Cloud node processor, a memory usage of an O-Cloud node, a disk throughput of an O-Cloud node, etc. The system may obtain the parameters from an O-Cloud server. The parameters may be collected and analyzed from O2 telemetry by the NRT RIC.

Based on the obtained parameters, the system may determine whether at least one parameter of the collected parameters of an O-Cloud node satisfies a predetermined modification condition. The predetermined modification condition may include conditions based on a CPU usage of the O-Cloud node being below a CPU usage percentage threshold, a memory usage of the O-Cloud node being below a memory usage percentage threshold, a disk throughput of the O-Cloud node being below a disk throughput usage percentage threshold, and/or a combination of such conditions. Based on determining that at least one parameter of the parameters collected satisfies the predetermined modification condition, the system may change the P-state of a processor (CPU operating frequency) within the O-Cloud node. For the purposes of this disclosure, P-state and "CPU operating frequency" may be used interchangeably.

The system may include a federated O-Cloud orchestration and management (FOCOM) controller of a service management and orchestration (SMO) framework, and the system may determine that at least one parameter satisfies the modification condition based on a predefined modification policy configured for the FOCOM controller. The system may alternatively or additionally include a non-real-time (NRT) RAN intelligent controller (RIC) for the SMO, and the NRT RIC may be configured to perform the operations described above.

Based on determining that at least one parameter satisfies the predetermined modification condition and prior to changing the P-state of the O-Cloud node processor, the system may notify the O-Cloud node that O-Cloud node is determined to be subject to a processor P-state change. In such instances, the P-state of the O-Cloud node processor may be altered after a predetermined grace period that starts about when the O-Cloud node is notified. Alternatively, the system may perform a non-graceful modification of the P-state of the O-Cloud node processor, providing no notification that the P-state of the O-Cloud node processor is determined to be modified. Furthermore, the system may terminate at least one application operating on the O-Cloud node prior to the O-Cloud node being deactivated.

Thus, by monitoring the O-RAN as is disclosed herein, power consumption may be reduced by changing the P-state O-Cloud node processors with limited or no use.

FIG. 1 is a diagram of an O-RAN architecture 100, according to an embodiment. The O-RAN architecture 100 may include SMO framework 102 including an NRT RIC 104 and a FOCOM controller 106. The O-RAN architecture 100 may include a near-real-time (nRT) RIC 108, an O-RAN Centralized Unit (O-CU) control plane (O-CU-CP) 110, an O-CU user plane (O-CU-UP) 112, an O-RAN Distributed Unit (O-DU) 114, an O-RAN Radio Unit (O-RU) 116, and an O-RAN Cloud (O-Cloud) server 118. The O-Cloud server 118 may include an infrastructure management service (IMS) module 120 and a deployment management services (DMS) module 122. As shown in FIG. 1, the FOCOM controller 106 may be configured to obtain parameters indicating traffic performance of O-Cloud nodes from the O-Cloud server 118. That is, the NRT RIC 104 may be pushing a predefined shutdown policy to the FOCOM controller 106.

Figure 4:
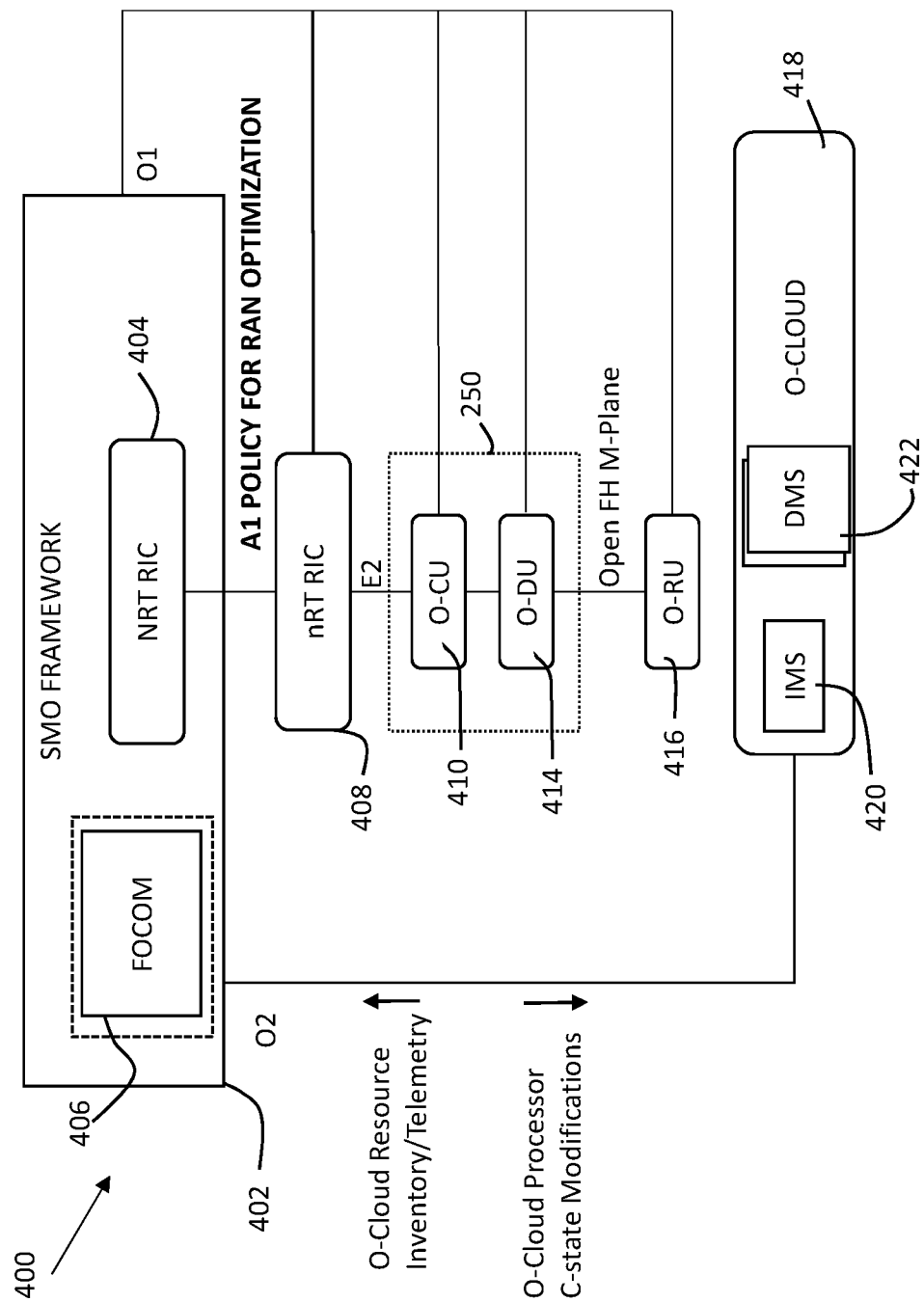
FIG. 4 is a diagram of an O-RAN architecture according to an embodiment.

FIG. 4 is a diagram of an O-RAN architecture 400, according to an embodiment. The O-RAN architecture 400 is similar to the O-RAN architecture 100, except that the NRT RIC 404 is configured to push the P-state modification actions. Furthermore, the O-RAN architecture 400 includes a fronthaul (FH) M-plane 450 including an O-CU 410 and an O-DU 414, as well as an O-RU 416 in connection with the FH M-plane 450. In such embodiments, the NRT RIC 404 may obtain the parameters indicating processor utilization of the O-Cloud nodes directly from the O-Cloud server 418, and may be configured to determine modifications of O-Cloud node processor P-states based on the parameters. The NRT RIC 404 may be configured to determine modification of O-Cloud node processor P-states without implementing a policy such as the policy implemented with the FOCOM controller 406. The NRT RIC 404 may be configured to push the P-state modification operations to the IMS module 420.

Figure 5:
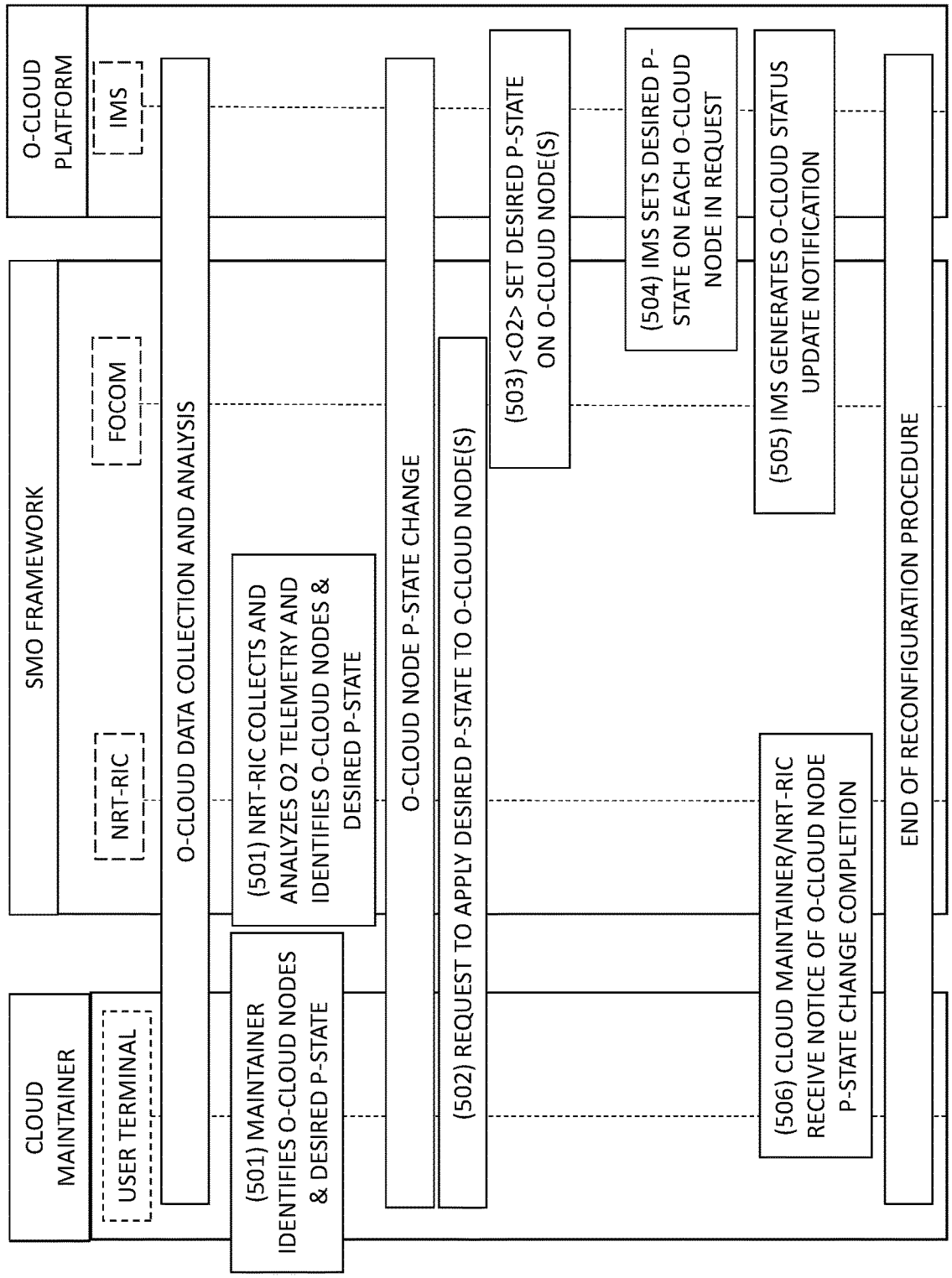
FIG. 5 is a sequence diagram of a method for modifying the P-state of one or more O-Cloud node processors, according to an embodiment.

FIG. 5 illustrates a sequence diagram of the method for modifying the P-state of one or more O-Cloud node processors according to an embodiment. The key components of the O-RAN architecture in FIG. 5 are similar to those according to FIG. 1.

Referring to FIG. 5, the method for implementing a modification of the P-state of one or more O-Cloud node processors may be triggered by an event such as telemetry indicating one or more O-Cloud node processors are being utilized at a level beneath a predetermined threshold, or input from non-RAN sources (e.g., O1 interface and/or O2 interface data).

In FIG. 5, the method for implementing the modification of the P-state of one or more O-Cloud node processors may be initiated by either a manual request to the SMO by a user or by one or more rApps of the NRT-RIC within the SMO.

Referring to FIG. 5, the initiation is illustrated as an O-Cloud node analysis process and marks the beginning of the O-Cloud node reconfiguration procedure. The initiation according to the O-Cloud node analysis process is based on monitoring, by either a user or the NRT-RIC, of O-Cloud data received over the O2 interface, analyzing the O-Cloud data and, based on the analysis, determining the at least one O-Cloud node processor to be reconfigured within the O-Cloud infrastructure.

To this end, in case the NRT-RIC within the SMO initiates the method, one or more rApps in NRT-RIC perform the O-Cloud node analysis process as set forth above.

In an example embodiment, the analysis may be based on a comparison between O2 interface telemetric data relating to the utilization of at least one O-Cloud node (e.g., O-Cloud data such as processor load, memory usage, etc.). Based on the analysis, the NRT-RIC (e.g., one or more rApps of the NRT-RIC) determines to reconfigure at least one O-Cloud node among a plurality of O-Cloud nodes (i.e., the NRT-RIC initiates the O-Cloud reconfiguration procedure for at least one O-Cloud node).

According to the O-Cloud reconfiguration procedure, in operation 501, in one example embodiment, the NRT-RIC (e.g., one or more rApps of the NRT-RIC) collects and analyzes O2 telemetry (e.g., O-Cloud data such as processor load, memory usage, etc.) and identifies one or more O-Cloud nodes among a plurality of O-Cloud nodes which meet certain predefined criteria for processor P-state modification and further identifies the appropriate P-state modification to implement for each identified C-Cloud node. In another example embodiment, operation 501 is carried out by a Cloud Maintainer (e.g., a user).

In operation 502, in one example embodiment, the SMO (i.e., the FOCOM) obtains a request from a Cloud Maintainer (e.g., a user) to apply a desired P-state to processors associated with the O-Cloud nodes identified in operation 501. In operation 502, in another example embodiment, the FOCOM obtains a request to reconfigure at least one O-Cloud node from the NRT-RIC based on the result of an O-Cloud analysis process as set forth above.

In operation 503, the FOCOM, upon the determination or specification as set forth above, sends a reconfiguration request to the IMS via the O2 interface. The reconfiguration request comprises, for each of the O-Cloud nodes to be reconfigured, the identity of each O-Cloud node to be reconfigured and the processor P-state to apply to each such O-Cloud node. Operation 503 may be repeated for each O-Cloud node identified in operation 501.

In operation 504, upon receiving the FOCOM reconfiguration request via the O2 interface, the IMS changes the processor P-state to the desired P-state for each O-Cloud node to be reconfigured. Change of the O-Cloud node processor P-state is normally enabled from O-Cloud node BIOS/UEFI. However, other available methods of P-state modification may be utilized.

In operation 505, the IMS, for each respective O-Cloud node notifies SMO that the O-Cloud node P-state modification is completed. In an example embodiment, the IMS sends a reconfiguration confirmation to the FOCOM via the O2 interface.

Also referring to operation 505, in an example embodiment, in case the NRT-RIC has subscribed for IMS notifications, the IMS notifies to NRT-RIC about the status of the O-Cloud node (i.e., the status of the reconfigured O-Cloud node (s)) via the O2 interface. In operation 506, the SMO notifies the Cloud Maintainer and the NRT RIC that the O-Cloud node P-state modifications are complete. In another example embodiment, the IMS may notify the FOCOM and the NRT-RIC about the completion of the reconfiguration via the O2 interface.

Referring to FIG. 5, the method for implementing the modification of the processor P-state of one or more O-Cloud nodes ends when the P-state of all O-Cloud nodes identified in operation 501 is complete.

Figure 6:
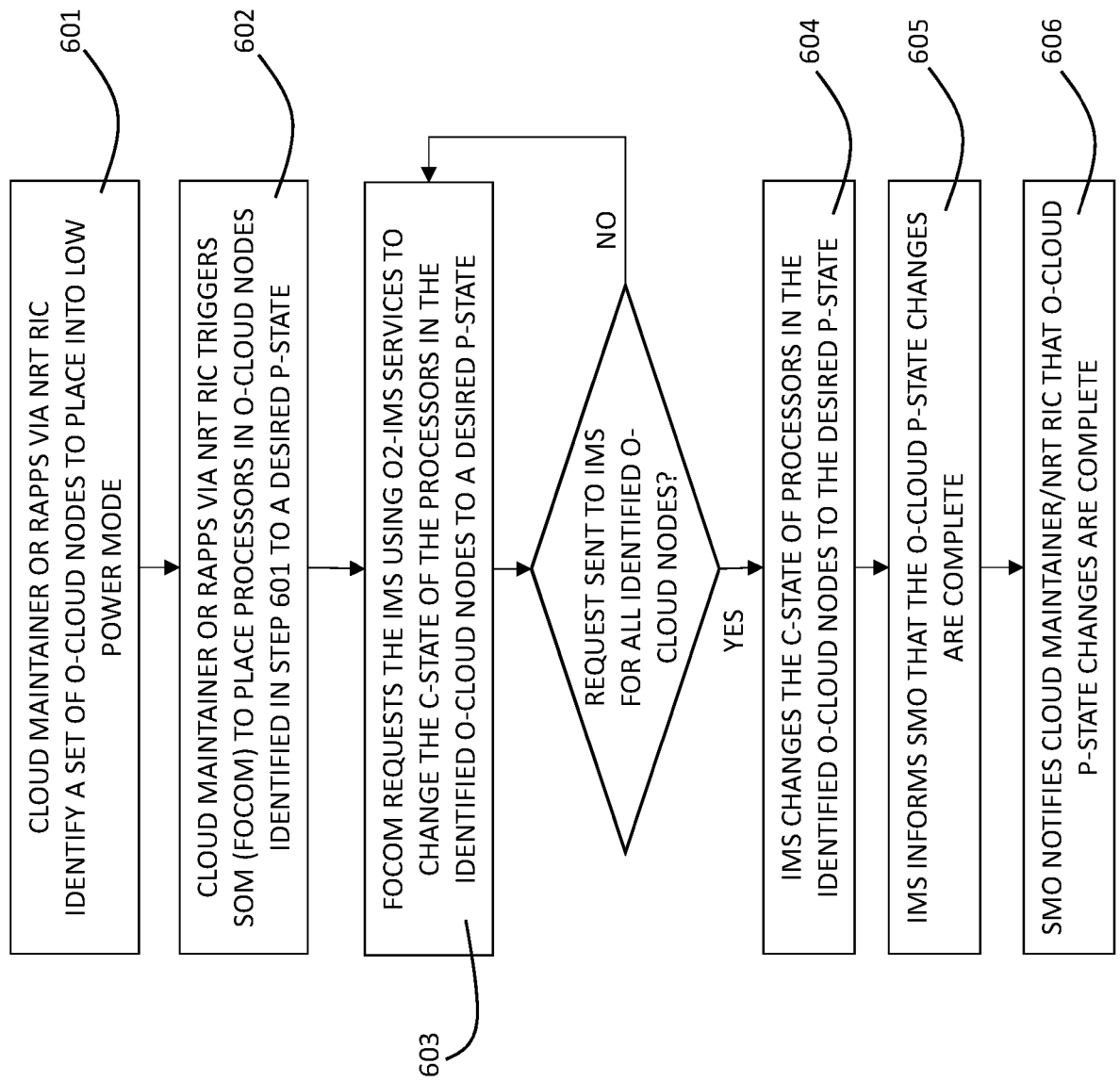
FIG. 6 is a flowchart of a method for power management in an O-RAN, according to an embodiment.

FIG. 6 is a flowchart of a method for power management in an O-RAN, according to an embodiment. In operation 601, the Cloud Maintainer (e.g., user) or rApps via the NRT RIC identify a set of O-Cloud nodes to place into low power mode based on an analysis of O2 telemetry such as CPU utilization, memory utilization, etc. In operation 602, either the Cloud Maintainer or rApps via the NRT RIC triggers the SOM (e.g., FOCOM) to place the processors of the O-Cloud nodes identified in operation 601 to a desired P-state. In operation 603, FOCOM requests, using O2 IMS services, that IMS change the P-state of the processors in the O-Cloud nodes identified in operation 601. Operation 603 may be repeated for each identified O-Cloud node. In an alternative embodiment, the FOCOM request is sent to IMS as a batch. In operation 604, IMS changes the P-state of the processors in the identified O-Cloud nodes to the desired P-state. In operation 605, IMS informs the SMO that the O-Cloud node P-state changes requested in operation 603 are complete. In operation 606, the SMO notifies the Cloud Maintainer and/or the NRT RIC that the O-Cloud node P-state changes triggered in operation 602 are complete.

Figure 7:
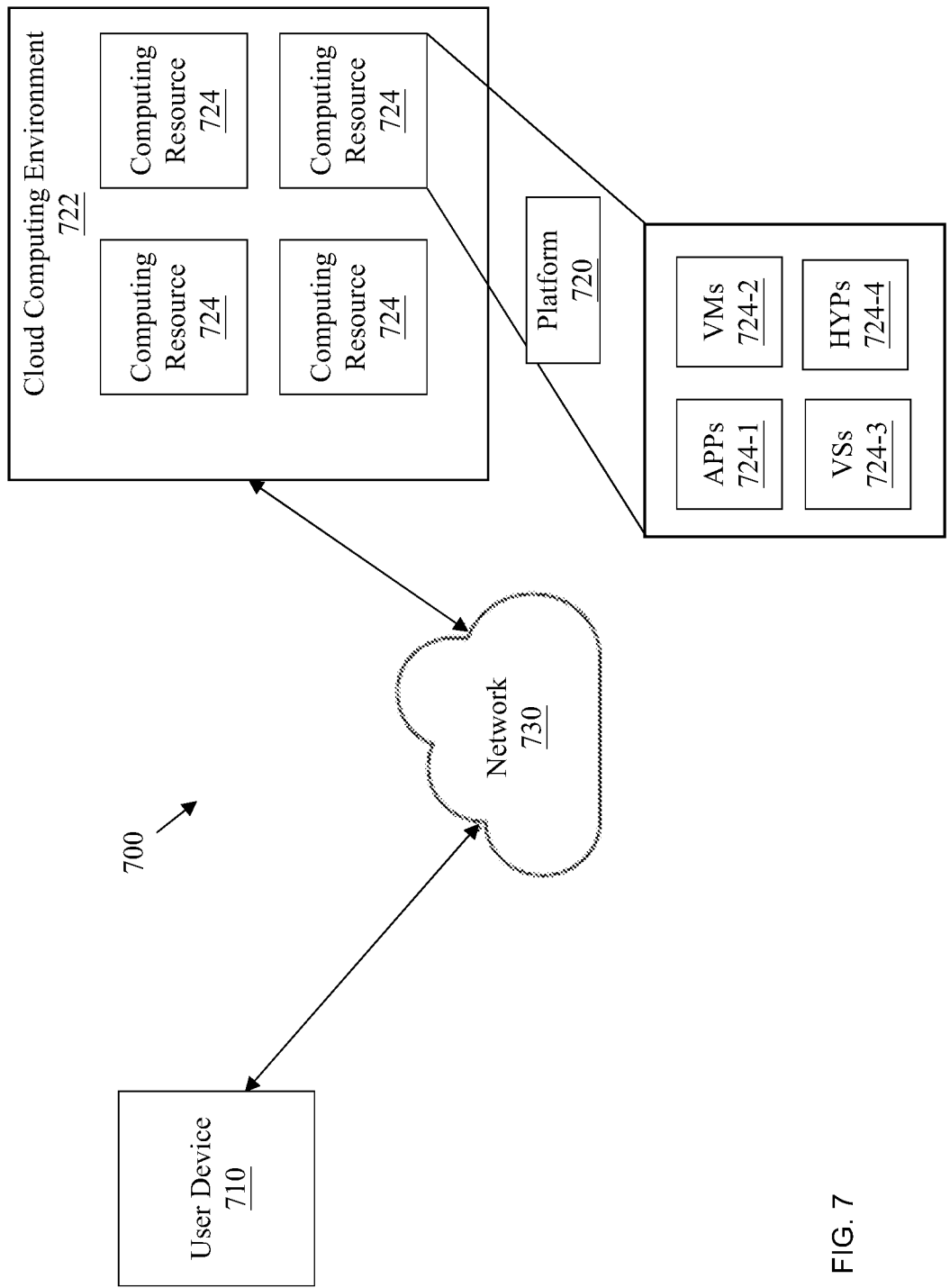
FIG. 7 is a diagram of an example environment in which systems and/or methods, described herein, may be implemented.

FIG. 7 is a diagram of an example environment 700 in which systems and/or methods, described herein, may be implemented. As shown in FIG. 7, environment 700 may include a user device 710, a platform 720, and a network 730. Devices of environment 700 may interconnect via wired connections, wireless connections, or a combination of wired and wireless connections. In embodiments, any of the functions and operations described with reference to FIG. 7 above may be performed by any combination of elements illustrated in FIG. 7.

User device 710 includes one or more devices capable of receiving, generating, storing, processing, and/or providing information associated with platform 720. For example, user device 710 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 710 may receive information from and/or transmit information to platform 720.

Platform 720 includes one or more devices capable of receiving, generating, storing, processing, and/or providing information. In some implementations, platform 720 may include a cloud server or a group of cloud servers. In some implementations, platform 720 may be designed to be modular such that certain software components may be swapped in or out depending on a particular need. As such, platform 720 may be easily and/or quickly reconfigured for different uses.

In some implementations, as shown, platform 720 may be hosted in cloud computing environment 722. Notably, while implementations described herein describe platform 720 as being hosted in cloud computing environment 722, in some implementations, platform 720 may not be cloud-based (i.e., may be implemented outside of a cloud computing environment) or may be partially cloud-based.

Cloud computing environment 722 includes an environment that hosts platform 720. Cloud computing environment 722 may provide computation, software, data access, storage, etc. services that do not require end-user (e.g., user device 710) knowledge of a physical location and configuration of system(s) and/or device(s) that hosts platform 720. As shown, cloud computing environment 722 may include a group of computing resources 724 (referred to collectively as "computing resources 724" and individually as "computing resource 724").

Computing resource 724 includes one or more personal computers, a cluster of computing devices, workstation computers, server devices, or other types of computation and/or communication devices. In some implementations, computing resource 724 may host platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

As further shown in FIG. 7, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, or the like.

Application 724-1 includes one or more software applications that may be provided to or accessed by user device 710. Application 724-1 may eliminate a need to install and execute the software applications on user device 710. For example, application 724-1 may include software associated with platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a complete system platform that supports execution of a complete operating system ("OS"). A process virtual machine may execute a single program, and may support a single process. In some implementations, virtual machine 724-2 may execute on behalf of a user (e.g., user device 710), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems, and may manage the execution of the guest operating systems. Multiple instances of a variety of operating systems may share virtualized hardware resources.

Network 730 includes one or more wired and/or wireless networks. For example, network 730 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
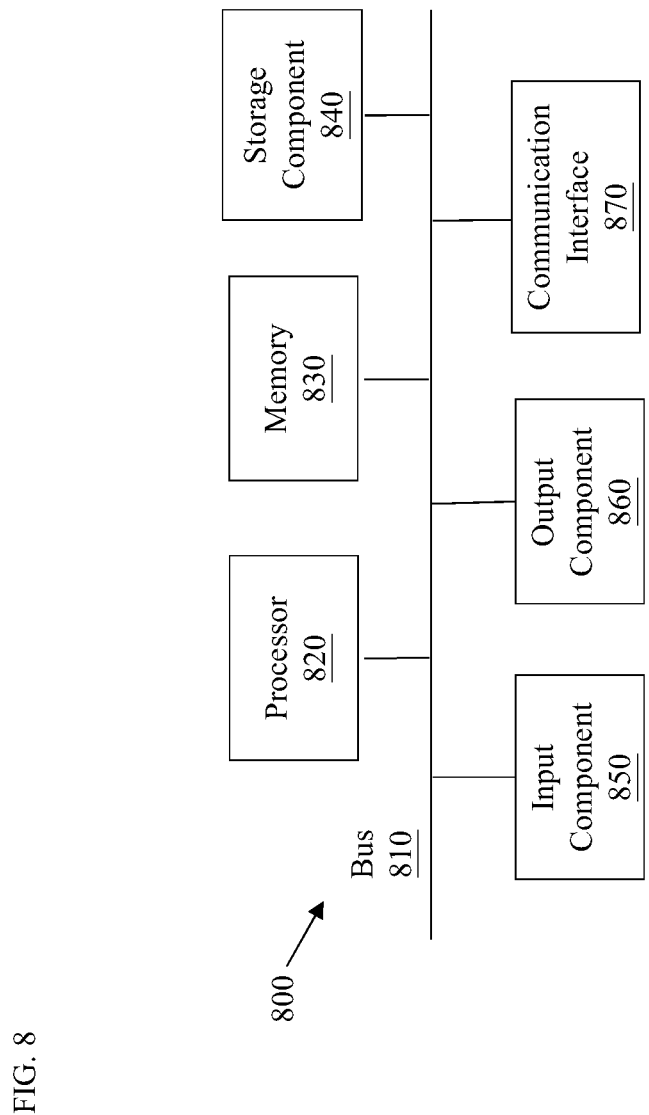
FIG. 8 is a diagram of example components of a device according to an embodiment.

FIG. 8 is a diagram of example components of a device 800. Device 800 may correspond to user device 710 and/or platform 720. As shown in FIG. 8, device 800 may include a bus 810, a processor 820, a memory 830, a storage component 840, an input component 850, an output component 860, and a communication interface 870.

Bus 810 includes a component that permits communication among the components of device 800. Processor 820 may be implemented in hardware, firmware, or a combination of hardware and software. Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. In some implementations, processor 820 is a single processor with multiple cores. Memory 830 includes a random access memory (RAM), a read only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 850 includes a component that permits device 800 to receive information, such as via user input (e.g., a touch screen display, a keyboard, a keypad, a mouse, a button, a switch, and/or a microphone). Additionally, or alternatively, input component 850 may include a sensor for sensing information (e.g., a global positioning system (GPS) component, an accelerometer, a gyroscope, and/or an actuator). Output component 860 includes a component that provides output information from device 800 (e.g., a display, a speaker, and/or one or more light-emitting diodes (LEDs)).

Communication interface 870 includes a transceiver-like component (e.g., a transceiver and/or a separate receiver and transmitter) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

Device 800 may perform one or more processes described herein. Device 800 may perform these processes in response to processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

In embodiments, any one of the operations or processes of FIGS. 5-6 may be implemented by or using any one of the elements illustrated in FIGS. 1-4 and FIGS. 7-8. It is understood that other embodiments are not limited thereto, and may be implemented in a variety of different architectures (e.g., bare metal architecture, any cloud-based architecture or deployment architecture such as Kubernetes, Docker, OpenStack, etc.).

According to example embodiments, one or more O-Cloud nodes are identified as candidates for modification to low power operation based on certain operating factors such as CPU usage, memory usage, etc. Once identified, the O-Cloud control system takes steps to change the P-state of one or more processors (or one or more cores of a single processor) in each O-Cloud node identified, and so doing, reducing the power consumption of the identified O-Cloud nodes.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of managing power consumption of one or more Open Radio Access Network (O-RAN) cloud (O-Cloud) nodes within an O-Cloud infrastructure of a telecommunications network, the method performed by at least one processor and comprising:
    obtaining, by a federated O-Cloud orchestration and management module (FOCOM) within a service management orchestration (SMO) framework of the ORAN, a request to modify a P-state of a central processing unit (CPU) of an O-Cloud node within the O-Cloud infrastructure of the telecommunications network;
    sending, by the FOCOM, a request to modify the P-state of the CPU of the O-Cloud node via an O2 interface to an infrastructure management service module (IMS) of the O-RAN;
    receiving, by the IMS via the O2 interface, the request to modify the P-state of the CPU of the O-Cloud node;
    controlling, by the IMS, implementation of the request to modify the P-state of the CPU of the O-Cloud node; and
    sending, by the IMS to the FOCOM via the O2 interface, a confirmation of the P-state modification of the CPU of the O-Cloud node.

2. The method of claim 1, further comprising:
    monitoring, by a non-real-time radio intelligent controller (NRT RIC), an O-Cloud data received over the O2 interface;
    analyzing the O-Cloud data and, based on the analysis, identifying the O-Cloud node to be modified within the O-Cloud infrastructure; and
    sending the O-Cloud node P-state modification request to the FOCOM.

3. The method of claim 2, wherein the O-Cloud data received over the O2 interface comprises at least one of a processor utilization and a memory utilization.

4. The method of claim 2, further comprising:
    sending, by the FOCOM to at least one of a user and the NRT RIC, a confirmation of the P-state modification of the CPU of the O-Cloud node.

5. The method of claim 4, wherein the O-Cloud data received over the O2 interface comprises at least one of a processor utilization and a memory utilization.

6. The method of claim 1, further comprising:
    monitoring, by a user, an O-Cloud data received over the O2 interface;
    analyzing the O-Cloud data and, based on the analysis, identifying the O-Cloud node to be change within the O-Cloud infrastructure; and
    sending the O-Cloud node P-state modification request to the FOCOM.

7. The method of claim 1, further comprising:
    sending, by the FOCOM to at least one of a user and a non-real-time radio intelligent controller (NRT RIC), a confirmation of the P-state modification of the CPU of the O-Cloud node.

8. A system for managing power consumption of one or more Open Radio Access Network (O-RAN) cloud (O-Cloud) nodes within an O-Cloud infrastructure of a telecommunications network, the system comprising:
    at least one memory configured to store computer program code; and
    at least one processor configured to access said at least one memory and operate as instructed by said computer program code, said computer program code including:
    O-Cloud infrastructure implementation code configured to cause the at least one processor to implement: (i) a federated O-Cloud orchestration and management module (FOCOM) within a service management orchestration (SMO) framework of the O-RAN, (ii) an infrastructure management service module (IMS) of the O-RAN, and (iii) an O2 interface between the SMO and the IMS;
    obtaining code configured to cause the at least one processor to obtain, by the FOCOM, a request to modify a P-state of a central-processing unit (CPU) of an O-Cloud node within the O-Cloud infrastructure of the telecommunications network;
    sending code configured to cause the at least one processor to send a request, from the FOCOM to the IMS via the O2 interface, to modify the P-state of the CPU of the O-Cloud node;
    controlling code configured to cause the at least one processor to implement, by the IMS, the request to modify the P-state of the CPU of the O-Cloud node; and
    sending code configured to cause the at least one processor to send, from the IMS to the FOCOM via the O2 interface, a confirmation of the P-state modification of the CPU of the O-Cloud node.

9. The system of claim 8, wherein the O-Cloud infrastructure implementation code further comprises code configured to cause the at least one processor to implement a non-real-time radio intelligent controller (NRT RIC), and wherein the computer program code further comprises:
    monitoring code configured to cause the at least one processor to receive, by the NRT RIC via the O2 interface, an O-Cloud data;

analyzing code configured to cause the at least one processor to analyze, by the NRT RIC, the O-Cloud data and, based on the analysis, identify the O-Cloud node to be modified within the O-Cloud infrastructure; and sending code configured to cause the at least one processor to send, by the NRT RIC to the FOCOM, the O-Cloud node P-state modification request.

10. The system of claim 9, wherein the O-Cloud data received over the O2 interface comprises at least one of a processor utilization and a memory utilization.

11. The system of claim 8, further comprising a human-machine interface configured to allow a user to receive and analyze an O-Cloud data via the O2 interface and to further allow the user to send the O-Cloud node P-state modification request to the FOCOM.

12. The system of claim 11, wherein the O-Cloud infrastructure implementation code further comprises code configured to cause the at least one processor to implement a non-real-time radio intelligent controller (NRT RIC), and wherein the computer program code further comprises sending code configured to cause the at least one processor to send, by the FOCOM to at least one of the user and the NRT RIC, a confirmation of the P-state modification of the CPU of the O-Cloud node.

13. The system of claim 8, wherein the O-Cloud infrastructure implementation code further comprises code configured to cause the at least one processor to implement a non-real-time radio intelligent controller (NRT RIC), and wherein the computer program code further comprises sending code configured to cause the at least one processor to send, by the FOCOM to at least one of a user and the NRT RIC, a confirmation of the P-state modification of the CPU of the O-Cloud node.

14. A non-transitory computer readable medium having instructions stored therein, which when executed by a processor cause the processor to execute method of managing power consumption of one or more Open Radio Access Network (O-RAN) cloud (O-Cloud) nodes within an O-Cloud infrastructure of a telecommunications network, the method comprising:

obtaining, by a federated O-Cloud orchestration and management module (FOCOM) within a service management orchestration (SMO) framework of the O-RAN, a request to modify a P-state of a central processing unit (CPU) of an O-Cloud node within the O-Cloud infrastructure of the telecommunications network;

sending, by the FOCOM, a request to modify the P-state of the CPU of the O-Cloud node via an O2 interface to an infrastructure management service module (IMS) of the O-RAN;

receiving, by the IMS via the O2 interface, the request to modify the P-state of the CPU of the O-Cloud node;

controlling, by the IMS, implementation of the request to modify the P-state of the CPU of the O-Cloud node; and sending, by the IMS to the FOCOM via the O2 interface, a confirmation of the P-state modification of the CPU of the O-Cloud node.

15. The non-transitory computer readable medium of claim 14, wherein the method further comprises:

monitoring, by a non-real-time radio intelligent controller (NRT RIC), an O-Cloud data received over the O2 interface;

analyzing the O-Cloud data and, based on the analysis, identifying the O-Cloud node to be modified within the O-Cloud infrastructure; and sending the O-Cloud node P-state modification request to the FOCOM.

16. The non-transitory computer readable medium of claim 15, wherein the O-Cloud data received over the O2 interface comprises at least one of a processor utilization and a memory utilization.

17. The non-transitory computer readable medium of claim 14, wherein the method further comprises:

monitoring, by a user, an O-Cloud data received over the O2 interface;

analyzing the O-Cloud data and, based on the analysis, identifying the O-Cloud node to be change within the O-Cloud infrastructure; and sending the O-Cloud node P-state modification request to the FOCOM.

18. The non-transitory computer readable medium of claim 17, wherein the O-Cloud data received over the O2 interface comprises at least one of a processor utilization and a memory utilization.

19. The non-transitory computer readable medium of claim 14, wherein the method further comprises:

sending, by the FOCOM to at least one of a user and a non-real-time radio intelligent controller (NRT RIC), a confirmation of the P-state modification of the process-CPU of the O-Cloud node.

* * * * *